Dec. 23, 1924.

C. PRESSLAND 1,520,307

MEANS FOR MAKING FLUID TIGHT SLIDING JOINTS IN INTERNAL COMBUSTION ENGINES

Filed Oct. 9, 1920          2 Sheets-Sheet 1

Inventor.
Clifford Pressland,
By B. Singer, Atty.

Dec. 23, 1924.

C. PRESSLAND 1,520,307

MEANS FOR MAKING FLUID TIGHT SLIDING JOINTS IN INTERNAL COMBUSTION ENGINES

Filed Oct. 9, 1920     2 Sheets-Sheet 2

Inventor
Clifford Pressland
by B Singer Atty

Patented Dec. 23, 1924.

1,520,307

UNITED STATES PATENT OFFICE.

CLIFFORD PRESSLAND, OF HAMPTON-ON-THAMES, ENGLAND.

MEANS FOR MAKING FLUID-TIGHT SLIDING JOINTS IN INTERNAL-COMBUSTION ENGINES.

Application filed October 9, 1920. Serial No. 415,939.

*To all whom it may concern:*

Be it known that I, CLIFFORD PRESSLAND, a subject of the King of Great Britain, residing at The Sub, Gloucester Road, Hampton-on-Thames, Middlesex, England, have invented new and useful Improvements in Means for Making Fluid-Tight Sliding Joints in Internal-Combustion Engines, of which the following is a specification.

This invention relates to means for making fluid tight sliding joints in internal combustion engines and has particular although not exclusive reference to means for preventing air leakage along the valve stems.

The object of the invention is to provide an improved fluid-tight longitudinally flexible connection between a valve stem and valve stem guide.

The invention consists essentially in a device for making fluid tight joints in internal combustion engines comprising a volute spring surrounding a valve stem and constituting a fluid tight longitudinally flexible connection between the valve stem and valve stem guide.

In the accompanying drawings:—

Figure 1:
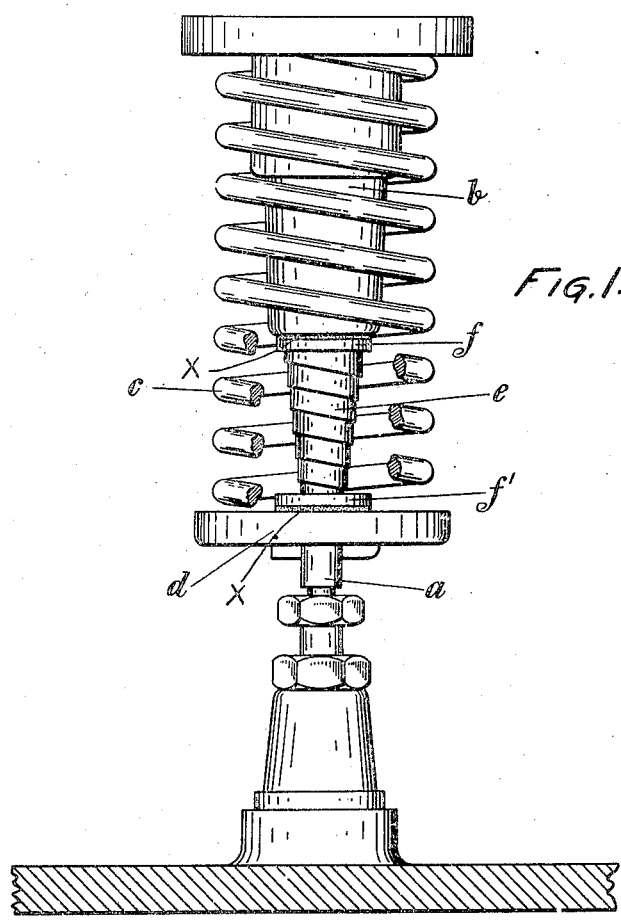
Figure 1 is an elevation partly in section showing the preferred form of the invention.

In the drawing $a$ indicates a valve stem of an internal combustion engine and $b$ the valve stem guide, a spring $c$ and collar $d$ of usual form being employed.

A flexible tube or casing $e$ is disposed between the collar $d$ and guide $b$ and comprises in the form illustrated a volute spring fitted at each end into suitable flanged disks $f$ and $f'$ between which and the guide and collar asbestos washers $x$ are preferably disposed. The flanged disks $f$ and $f'$ are added to the conventional organization as well as the spring and the washers. It is desirable to fill the flexible tube with a lubricant and for this purpose it is preferred to employ graphite paste.

The flanged disk $f$ into which the outer coil of the volute spring is fitted restricts the expansion of the spring and so renders the same more airtight.

The flanged disks $f$ and $f'$ preferably abut against the guide $b$ and collar $d$ respectively, and asbestos washers may be interposed between the flanged disks and the guide and collar, but the flanged disk $f'$ may be secured to the valve stem $a$ or collar $d$ by any suitable means of a clip or cage, whilst the flanged disk $f$ may be rigidly attached to the guide $b$. The movements of the valve stem relatively to the guide are thus communicated to the flexible tube $e$ which is alternately compressed and expanded.

Figure 2:
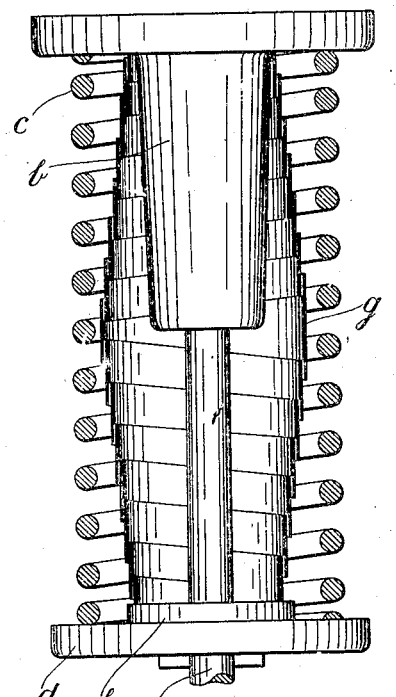
Figure 2 is a sectional view of a modified form of the invention as applied to valve in which the distance between the valve stem guide and valve stem collar is very long.
Figure 4:
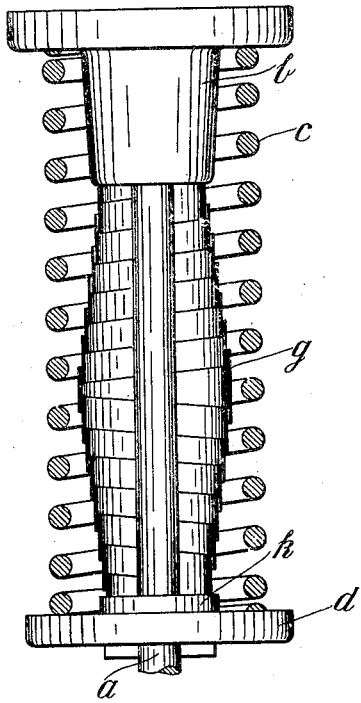
Figure 3:
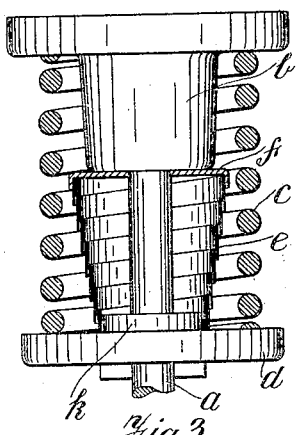
Figure 3 is a sectional view of a further modified form as applied to valve stems in which the distance between the valve stem collar is short and, Figure 4 is a sectional view of an alternative arrangement for valve stems in which the distance between the valve stem guide and valve stem collar is very long.

When the distance between the guide $b$ and collar $d$ is small, one end of the flexible tube or casing $e$ may be fitted over a boss $k$ on the collar, and when the distance is long asbestos washers may be used as distance pieces. In cases where the distance is very long a double volute spring may be used and in this case the volute spring $g$ may enclose the guide $b$ as shown in Figure 2 and bear against the part of the cylinder casing to which the guide is secured or on which its is formed or alternately it may bear against the edge of the guide as in the other forms and as shown in Figure 4.

Figure 5:
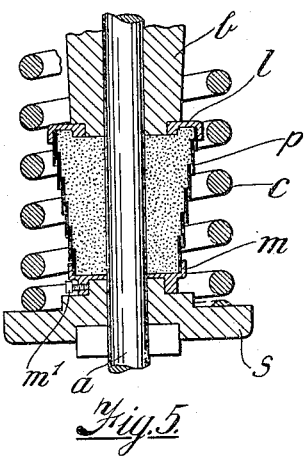
Figures 5 and 6 are detail sectional views of other modifications.
Figure 6:
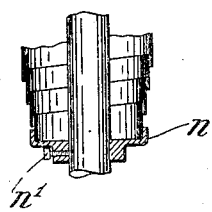

Figure 5 shows the lubricant fitting into the housing and also shows the housing secured to the collar by means of a set screw $m'$ and the housing $l$ tightly fitted onto the valve stem guide. Figure 6, shows the housing $n$ (corresponding to the housing $m$) secured to the valve stem by means of a set screw $n'$.

The invention possesses the advantage that it can be fitted to existing engines, it being necessary only to remove the collar $d$, pass on the asbestos washer, a flexible tube, and a second washer over the stem and again secure the collar in position.

I claim:—

1. In an internal combustion engine, a fluid-tight joint comprising a valve stem, a valve stem guide, a fluid-tight volute spring surrounding said valve stem, a fluid-tight joint between said valve stem and said volute spring and a fluid-tight joint between said valve stem guide and said volute spring.

2. In an internal combustion engine a fluid-tight joint comprising a valve stem, a valve stem guide, a fluid-tight volute spring surrounding said valve stem, means for restricting the expansion of the outer coil of said volute spring, a fluid-tight joint between said valve stem and said volute spring and a fluid-tight joint between said valve stem guide and said volute spring.

3. A fluid-tight joint comprising a movable member, a stationary member, a fluid tight volute spring, a fluid-tight joint between said movable member and said volute spring and a fluid-tight joint between said stationary member and said volute spring.

4. In an internal combustion engine, a fluid-tight joint comprising a valve stem, a valve stem guide, a fluid-tight volute spring surrounding said valve stem, a flanged disk disposed around one end of said spring, a flanged disk surrounding the other end of said spring and a rigid connection between said second mentioned flanged disk and said valve stem guide, said flanged discs forming fluid-tight joints between said volute spring and said valve stem and valve stem guide.

5. In an internal combustion engine, a fluid-tight joint comprising a valve stem, a valve stem guide, a collar mounted upon said valve stem, a fluid-tight volute spring surrounding said valve stem, an asbestos washer disposed between one end of said volute spring and said collar, and an asbestos washer disposed between the other end of said volute spring and said valve stem guide.

6. In an internal combustion engine, a fluid-tight joint comprising a valve stem, a valve stem guide, a fluid-tight volute spring forming a casing surrounding said valve stem and adapted to hold a charge of lubricant, a fluid-tight joint between said valve stem and said volute spring and a fluid-tight joint between said valve stem guide and said volute spring.

7. In an internal combustion engine, a fluid-tight joint comprising a valve stem, a valve stem guide, a collar mounted upon said valve stem, a fluid-tight volute spring surrounding said valve stem, means for restricting the expansion of the outer coil of said volute spring, a fluid-tight joint between said collar and said volute spring and a fluid-tight joint between said valve stem guide and said volute spring.

8. In an internal combustion engine a fluid-tight joint comprising a valve stem, a valve stem guide, a collar mounted upon said valve stem, a fluid-tight volute spring surrounding said valve stem, a flanged disk engaging one end of said spring, a flanged disk engaging the other end of said spring and a rigid connection between said second mentioned flanged disk and said valve stem guide, said flanged disks forming fluid-tight joints between said volute spring and said valve stem and valve stem guide.

In testimony whereof I affix my signature.

CLIFFORD PRESSLAND.